US012621573B2

(12) United States Patent
Komura

(10) Patent No.: US 12,621,573 B2
(45) Date of Patent: May 5, 2026

(54) BRIGHTNESS MEASUREMENT APPARATUS, BRIGHTNESS MEASUREMENT METHOD, BRIGHTNESS MEASUREMENT PROGRAM, AND CAMERA SYSTEM

(71) Applicant: DENSO CORPORATION, Kariya-city (JP)

(72) Inventor: Ikuko Komura, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 174 days.

(21) Appl. No.: 18/410,838

(22) Filed: Jan. 11, 2024

(65) Prior Publication Data

US 2024/0244331 A1 Jul. 18, 2024

(30) Foreign Application Priority Data

Jan. 13, 2023 (JP) ................................. 2023-003857

(51) Int. Cl.
*H04N 23/71* (2023.01)
*H04N 23/73* (2023.01)

(52) U.S. Cl.
CPC ............. *H04N 23/71* (2023.01); *H04N 23/73* (2023.01)

(58) Field of Classification Search
CPC ...... H04N 23/71; H04N 23/73; H04N 23/611; H04N 23/61
See application file for complete search history.

(56) References Cited

U.S. PATENT DOCUMENTS

| | | | |
|---|---|---|---|
| 8,488,958 B2 * | 7/2013 | Brunner | H04N 23/71 |
| | | | 396/233 |
| 9,247,150 B2 * | 1/2016 | Kuwata | H04N 23/72 |
| 11,539,894 B2 * | 12/2022 | Nakayama | G06V 20/584 |
| 2009/0174808 A1 | 7/2009 | Mochida et al. | |
| 2014/0247376 A1 | 9/2014 | Kuwata | |

FOREIGN PATENT DOCUMENTS

| | | |
|---|---|---|
| JP | H09142210 | 6/1997 |
| JP | H10-210354 A | 8/1998 |

* cited by examiner

*Primary Examiner* — Ahmed A Berhan
(74) *Attorney, Agent, or Firm* — Precision Patents, P.C.

(57) ABSTRACT

A processor of a brightness measurement apparatus sets, on an imaging region of a camera, a brightness measurement region that has a center part and peripheral parts that surround the center part. The brightness measurement region includes subregions. The subregions include central subregions located in the center part of the brightness measurement region, and peripheral subregions located in the peripheral parts of the brightness measurement region. A size of at least one of the central subregions is different from a size of at least one of the peripheral subregions. The processor measures, for each subregion, a brightness of the corresponding subregion in accordance with a pixel value of at least one pixel of a frame image captured by the camera through the imaging region. The pixel value of the at least one pixel of the frame image is included in the corresponding subregion.

19 Claims, 7 Drawing Sheets

Figure 2:
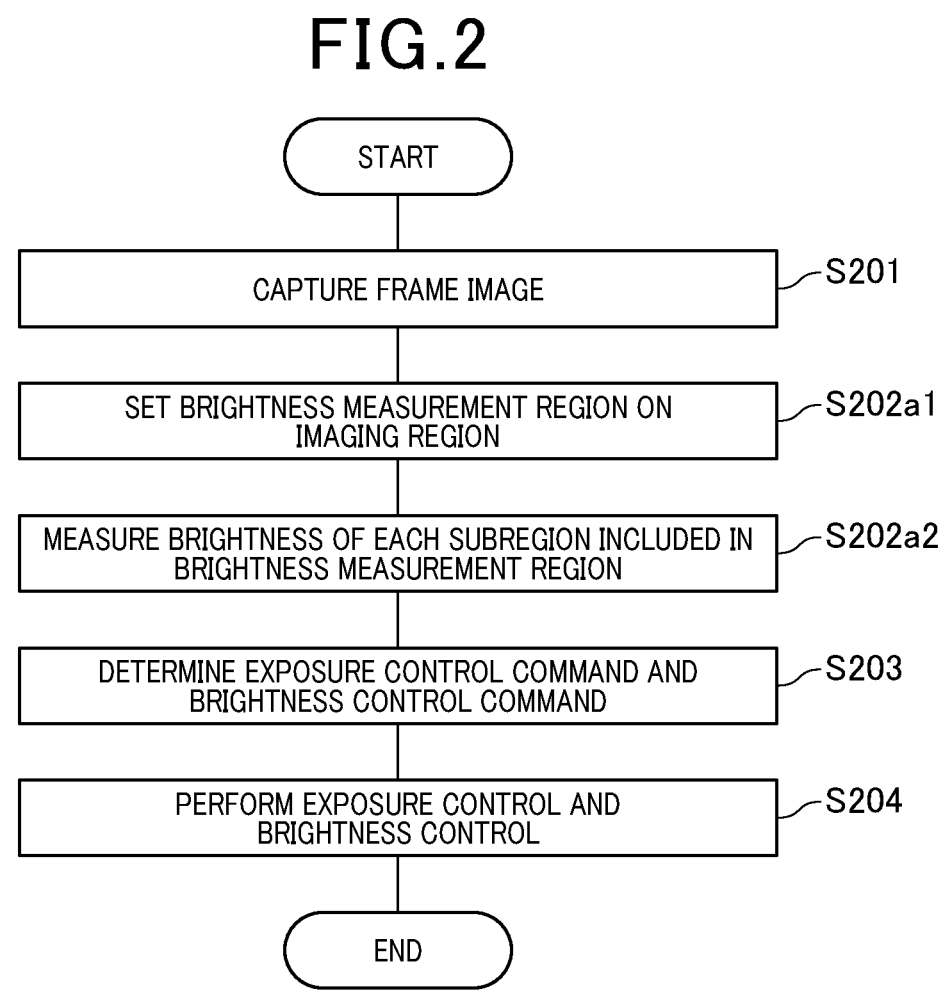

START

CAPTURE FRAME IMAGE ⟋S201

SET BRIGHTNESS MEASUREMENT REGION ON IMAGING REGION ⟋S202a1

MEASURE BRIGHTNESS OF EACH SUBREGION INCLUDED IN BRIGHTNESS MEASUREMENT REGION ⟋S202a2

DETERMINE EXPOSURE CONTROL COMMAND AND BRIGHTNESS CONTROL COMMAND ⟋S203

PERFORM EXPOSURE CONTROL AND BRIGHTNESS CONTROL ⟋S204

END

BRIGHTNESS MEASUREMENT APPARATUS, BRIGHTNESS MEASUREMENT METHOD, BRIGHTNESS MEASUREMENT PROGRAM, AND CAMERA SYSTEM

CROSS REFERENCE TO RELATED APPLICATION

This application is based on and claims the benefit of priority from Japanese Patent Application No. 2023-003857 filed on Jan. 13, 2023, the disclosure of which is incorporated in its entirety herein by reference.

TECHNICAL FIELD

The present disclosure relates to brightness measurement apparatuses, brightness measurement methods, brightness measurement programs, and camera systems.

BACKGROUND

Technologies using a vehicular camera installed in a vehicle, include (i) display of camera's captured images, (ii) recognition of solid objects, such as other vehicles, and lane markers, and (iii) travel control based on the recognition results. These technologies require an increase in the visibility of the captured images. In order to increase the visibility of captured images, it is important to control exposure of a vehicular camera appropriately depending on the brightness of each captured image.

For example, Japanese Patent Application Publication No. 2009-157085 discloses a technical concept that specifies a part of an image captured by a vehicular camera as a recognition region for recognizing a recognition target, and measures the brightness of the recognition region. Then, the inventive concept controls exposure of the vehicular camera in accordance with the brightness of the recognition region. Because the recognition region included in a captured image is used to measure the brightness thereof, the recognition region can be referred to as a brightness measurement region.

SUMMARY

Some vehicles may use a wide-angle camera equipped with a wide-angle lens, such as a fish-eye lens. The wide-angle camera used by a vehicle can capture, by one shot, a wide-angle view around the vehicle. The term "wide angle" in the present disclosure typically represents a wide angle of camera's view, which is substantially between 60° and 100°. The term "wide angle" in the present disclosure can include a super-wide angle of camera's view, which is substantially between 100° and 180° or is over 180°. The term "wide angle" in the present disclosure can also include a range from 50° to 60°.

Image signal processors (ISP) are used to perform a sequence of various operations of image-signal processing on images captured by a vehicular camera, such as a wide-angel camera. Such an ISP typically sections the brightness measurement region into a predetermined number of subregions, and performs the sequence of various operations of the image-signal processing for each divided subregion of the brightness measurement region.

An image captured by such a wide-angle camera may have a great degree of distortion, that is, a great degree of barrel distortion.

Let us assume that the brightness measurement region of a captured image is divided equally into a predetermined number of subregions.

In this assumption, the barrel distortion of the captured image may cause the center of the captured image to be larger than the peripheries of the captured image.

The larger center of the captured image may result in real dimensions, such as real length and/or real size, in any subregion included in the center of the captured image being relatively smaller. Similarly, the smaller peripheries of the captured image may result in real dimensions in any subregion included in the peripheries of the captured image being relatively larger.

The brightness distribution measured in the brightness measurement region in the captured image may therefore become different from the brightness distribution in a corresponding region in real space.

Additionally, the distortion, such as the barrel distortion, in a captured image may result in a low degree of flexibility in specifying a brightness measurement region in the captured image.

In view of the circumstances set forth above, an exemplary aspect of the present disclosure seeks to provide technologies, each of which is capable of specifying, in a captured image, a brightness measurement region whose brightness distribution matches a brightness distribution of a corresponding region in real space. Additionally, each of the technologies provided by the exemplary aspect of the present disclosure is capable of achieving a higher degree of flexibility in specifying a brightness measurement region in a captured image.

A first exemplary measure of the present disclosure provides a brightness measurement apparatus. The brightness measurement apparatus includes a memory storing computer-program instructions, and a processor communicable with the memory and a camera. The processor is configured to execute the computer-program instructions to accordingly set, on an imaging region of the camera, a brightness measurement region that has a center part and peripheral parts that surround the center part. The brightness measurement region includes a plurality of subregions. The plurality of subregions includes central subregions located in the center part of the brightness measurement region, and peripheral subregions located in the peripheral parts of the brightness measurement region. A size of at least one of the central subregions is different from a size of at least one of the peripheral subregions.

The processor is configured to execute the computer-program instructions to accordingly measure, for each of the plurality of subregions of the brightness measurement region, a brightness of the corresponding one of the plurality of subregions of the brightness measurement region in accordance with a pixel value of at least one pixel of a frame image captured by the camera through the imaging region. The pixel value of the at least one pixel of the frame image is included in the corresponding one of the plurality of subregions.

A second exemplary measure of the present disclosure provides a method to be executed by a processor in accordance with computer-program instructions stored in a memory. The method includes (i) setting, on an imaging region of a camera, a brightness measurement region that has a center part and peripheral parts that surround the center part. The brightness measurement region includes a plurality of subregions. The plurality of subregions includes central subregions located in the center part of the brightness measurement region, and peripheral subregions located in the peripheral parts of the brightness measurement region. A size of at least one of the central subregions is different from a size of at least one of the peripheral subregions.

The method includes (ii) measuring, for each of the plurality of subregions of the brightness measurement region, a brightness of the corresponding one of the plurality of subregions of the brightness measurement region in accordance with a pixel value of at least one pixel of a frame image captured by the camera through the imaging region. The pixel value of the at least one pixel of the frame image is included in the corresponding one of the plurality of subregions.

A third exemplary measure of the present disclosure provides a processor-readable program product. The processor-readable program product includes a storage media, and a set of computer-program instructions stored in the storage media. The computer-program instructions cause a processor to set, on an imaging region of a camera, a brightness measurement region that has a center part and peripheral parts that surround the center part. The brightness measurement region includes a plurality of subregions. The plurality of subregions includes central subregions located in the center part of the brightness measurement region, and peripheral subregions located in the peripheral parts of the brightness measurement region. A size of at least one of the central subregions is different from a size of at least one of the peripheral subregions.

The computer-program instructions cause the processor to measure, for each of the plurality of subregions of the brightness measurement region, a brightness of the corresponding one of the plurality of subregions of the brightness measurement region in accordance with a pixel value of at least one pixel of a frame image captured by the camera through the imaging region. The pixel value of the at least one pixel of the frame image is included in the corresponding one of the plurality of subregions.

A fourth exemplary measure of the present disclosure provides a camera system. The camera system includes a camera including a lens, and a brightness measurement apparatus.

The brightness measurement apparatus is configured to set, on an imaging region of the camera, a brightness measurement region that has a center part and peripheral parts that surround the center part. The brightness measurement region includes a plurality of subregions. The plurality of subregions includes central subregions located in the center part of the brightness measurement region, and peripheral subregions located in the peripheral parts of the brightness measurement region. A size of at least one of the central subregions is different from a size of at least one of the peripheral subregions.

The brightness measurement apparatus is configured to measure, for each of the plurality of subregions of the brightness measurement region, a brightness of the corresponding one of the plurality of subregions of the brightness measurement region in accordance with a pixel value of at least one pixel of a frame image captured by the camera through the imaging region. The pixel value of the at least one pixel of the frame image is included in the corresponding one of the plurality of subregions.

BRIEF DESCRIPTION OF THE DRAWINGS

Other aspects of the present disclosure will become apparent from the following description of embodiments with reference to the accompanying drawings in which:

FIG. 1 is a block diagram illustrating a schematic structure of a vehicular system equipped with a camera system according to the first embodiment of the present disclosure;

FIG. 2 is a flowchart schematically illustrating an example of an exposure/brightness control task carried out by a processor illustrated in FIG. 1;

DETAILED DESCRIPTION OF EMBODIMENT

Figure 3:
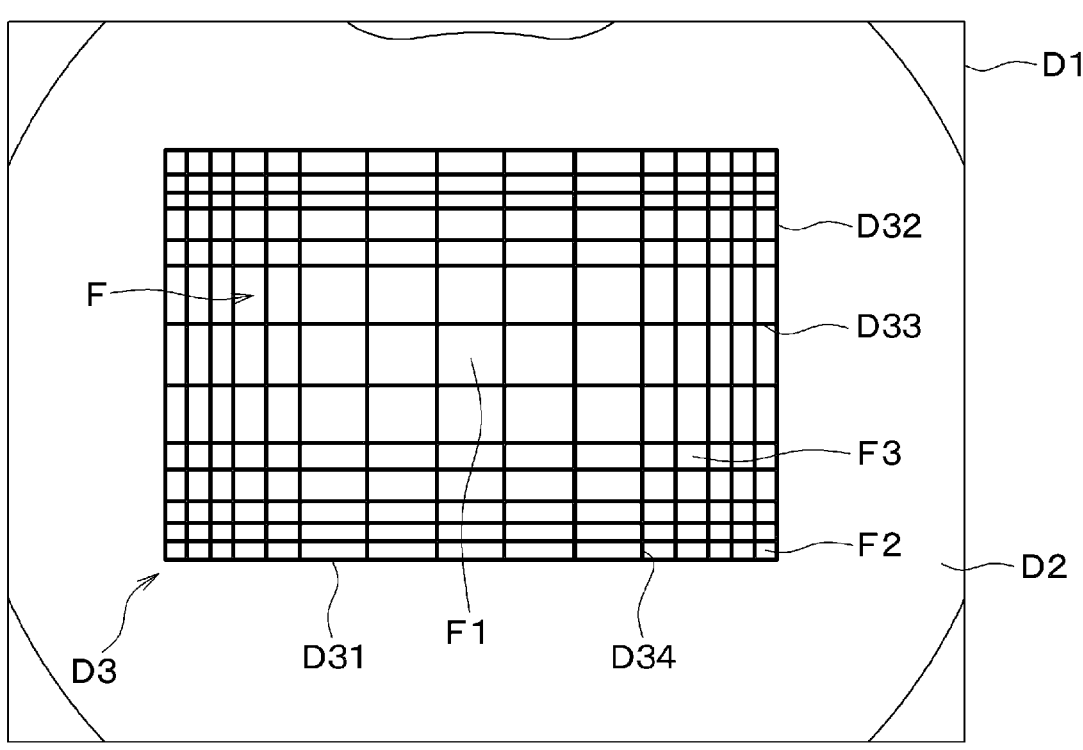
FIG. 3 is a diagram schematically illustrating how a brightness measurement task included in the exposure/brightness control task is carried out according to the first embodiment.

The following describes exemplary embodiments of the present disclosure with reference to FIGS. 1 to 8. If various modifications, which can be applied to each exemplary embodiment, were inserted into the series descriptions of the corresponding exemplary embodiment, understanding of the corresponding exemplary embodiment might be interrupted. For this reason, the various modifications will be collectively described after the descriptions of all the exemplary embodiments. Illustrations of the figures and descriptions of a structure, a function, and an operation, of each component hereinafter may be, in some case, simplified in order to simply describe the contents of each exemplary embodiment. For this reason, such simplified illustrations of the figures and/or simplified descriptions of the structural elements do not limit the subject matter of the present disclosure.

Exemplary structures illustrated in the figures do not necessarily match corresponding specific structures actually manufactured and sold. That is, unless the applicant explicitly limits the subject matter of the present disclosure during prosecution history of the present application, the subject matter of the present disclosure must not be interpreted restrictedly based on the descriptions of a structure, a function, and an operation, of each component hereinafter.

First Embodiment

Figure 1:
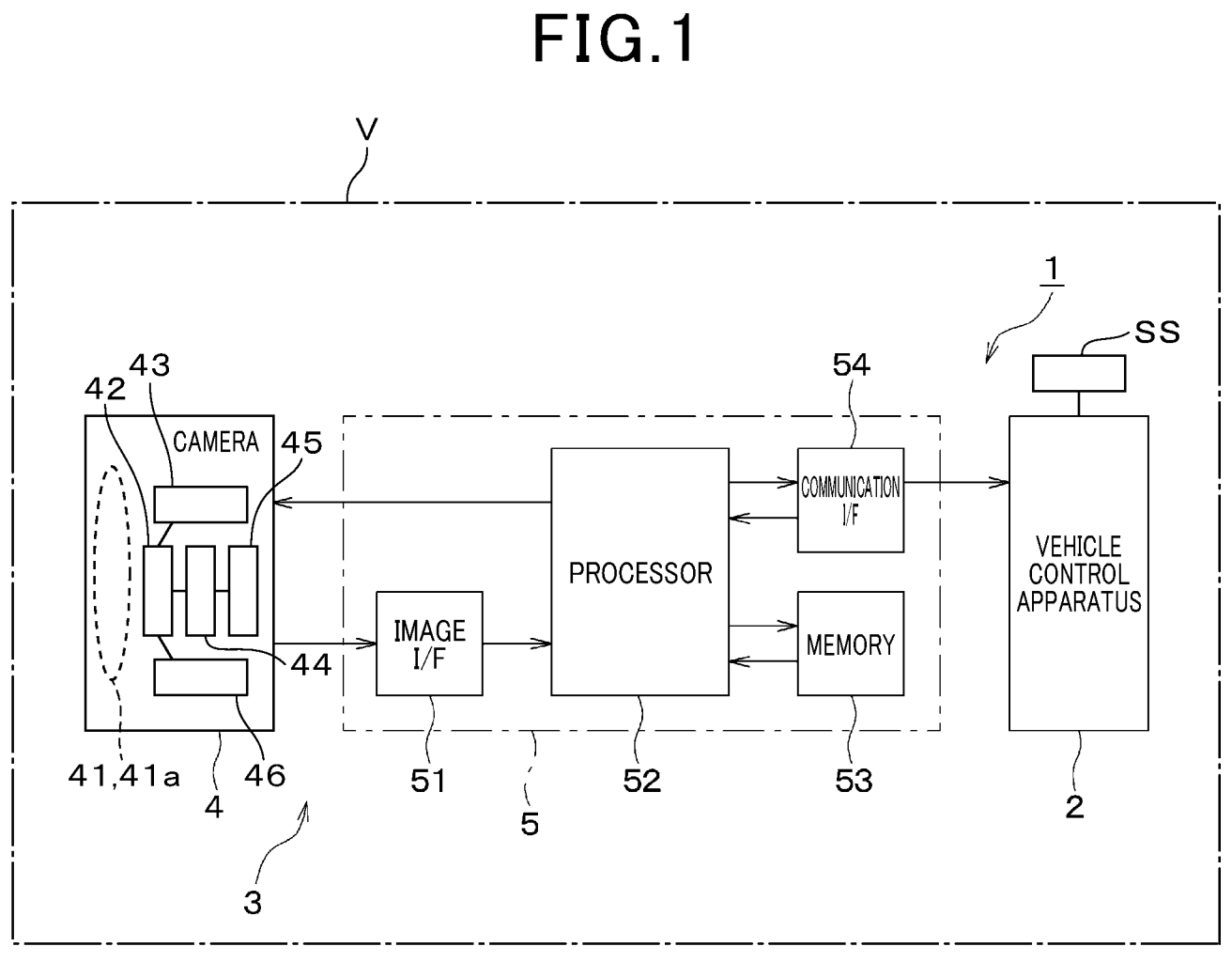

Referring to FIG. 1, a vehicular system 1 is installed in a vehicle V, such as a motor vehicle, and configured to control overall operations of the vehicle V. These overall operations of the vehicle V can include, for example, travel control operations, information notifying operations, and warning outputting operations. The vehicular system 1 is configured as a driving automation system. Such a driving automation system represents a genetic concept including an automated driving system (ADS) and a drive assist (drive support) system.

The term "automated driving" represents driving-automation levels that handle, i.e., perform, by such a driving automation system, the full dynamic driving task (DDT), which corresponds to levels 3 to 5 of driving automation defined by SAE standard J3016 opened by the Society of Automotive Engineers' (SAE) international.

The term "dynamic driving task (DDT)" means all of the real-time operational and tactical ADS functions required to operate the ADS-equipped vehicle in on-road traffic while excluding strategic functions such as trip scheduling and selection of destinations and waypoints. That is, the strategic functions may include a function of selecting or determining (i) whether the ADS-equipped vehicle moves, (ii) when the ADS-equipped vehicle moves, (iii) where the ADS-equipped vehicle moves, and (iv) how the ADS-equipped vehicle moves.

The term "drive assist (drive support)", which corresponds to the levels 1 and 2 of driving automation defined by SAE standard J3016, represents the sustained and the ODD (Operational Design Domain)-specific execution by an ADS of either the lateral or longitudinal vehicle motion control subtask, or both the lateral and longitudinal vehicle motion control subtasks of the DDT.

The vehicle motion control subtasks include, for example, starting, steering, accelerating, decelerating, braking, stopping, and shift-range changing.

That is, the term "drive support (drive assist)" means drive support (assist) functions that include, for example, at least one of a lane keeping assist function, a lane change assist function, an automatic lane-change assist function, and a collision avoidance assist function.

The vehicular system 1 includes a vehicle control apparatus 2, a camera system 3, and various sensors SS that include, for example, wheel-speed sensors and a gyro sensor.

The vehicle control apparatus 2 is configured to perform various tasks for controlling all the operations of the vehicle V and/or assisting driver's driving operations of the vehicle V in accordance with (i) image signals captured by the camera system 3 and (ii) measurement signals measured by the various sensors; the measurement signals represent the operating conditions of the vehicle V.

The camera system 3 is comprised of a camera 4 and a camera electronic control unit (ECU) 5.

The camera 4 is mounted to a selected portion of the vehicle V to capture a predetermined view from the vehicle V, making it possible to visually detect one or more target objects, such as other vehicles, around the vehicle V.

The camera 4 according to the first embodiment is comprised of, for example, a wide-angle lens 41 held by an unillustrated lens barrel, so that the camera 4 is configured as a wide-area camera.

The camera 4 is also comprised of a circuit board 40 that includes, for example, an image sensor 42, an exposure control mechanism, in other words, a shutter control mechanism, 43, an amplifier unit 44, an analog-digital converter 45, and a readout unit 46.

The image sensor 42 is comprised of light-sensitive elements each including a CCD device or CMOS switch; the light-sensitive elements serve as pixels and are arranged in a two-dimensional array in both vertical and horizontal directions corresponding to the respective height direction and width direction of the vehicle V. That is, the array of the pixels is configured as a predetermined number of columns by a predetermined number of rows. The two-dimensionally arranged pixels constitute a two-dimensional light receiving region, i.e., a two-dimensional effective pixel region, of the image sensor 42.

The camera ECU 5 includes an image interface (I/F) 51, a processor 52, a memory 53, and a communication interface (I/F) 54.

The image interface 51, which is electrically arranged between the camera 4 and the processor 52, serves as an interface that communicably links the camera 4 to the processor 52 for input of images captured by the camera 4 to the processor 52 of the camera ECU 5.

The processor 52 is communicable with the memory 53. The processor 52 is, for example, configured as an image signal processor 52 for performing a sequence of various operations of image-signal processing on images captured by the camera 4.

The memory 53, which is comprised of one or more non-transitory processor-readable storage media, such as one or more flash memories and/or one or more magnetic disks, is connected to the processor 52. The memory 53 is configured to store instructions of computer programs, and various parameters that can be used by the processor 52 when the processor 52 runs the computer-program instructions. The memory 53 is additionally configured to hold processing results by the processor 52.

The communication interface 54, which is electrically arranged between the processor 52 and the vehicle control apparatus 2, serves as an interface that communicably links the processor 52 and the vehicle control apparatus 2 to each other.

In particular, the processor 52 is configured to execute the computer-program instructions stored in the memory 53 to accordingly execute an exposure/brightness control task that includes a brightness measurement task.

The following describes how the camera 42 captures images, and how the camera ECU 5, i.e., the processor 52, executes the brightness measurement task included in the exposure/brightness control task.

The camera 4 is configured such that incoming light is focused, through the wide-angle lens 41, onto the two-dimensional effective pixel region of the image sensor 42 as an image of the predetermined view from the vehicle V.

The exposure control mechanism, i.e., shutter control mechanism, 43 is controlled by, for example, the camera ECU 5, to control an exposure time, i.e., a shutter time or a shutter speed, of the image sensor 42. That is, the image sensor 42 is configured to receive, during the exposure time, i.e., the shutter time, controlled by the exposure control mechanism 43, incoming light focused on the two-dimensional effective pixel region thereof as an image, so that each of the two-dimensionally arranged light-sensitive elements (pixels) receives a corresponding light component. The exposure time during which incoming light is received by the two-dimensionally arranged light-sensitive elements, in other words, during which the two-dimensionally arranged light-sensitive elements are exposed to incoming light, is a control parameter controllable by the camera ECU 5 through the exposure control mechanism 43.

That is, the camera 4 is configured to cyclically capture an image, i.e., a frame image, of the predetermined view from the vehicle V at a predetermine frame rate in accordance with the exposure time controlled for each frame image to be captured.

Each of the two-dimensionally arranged light sensitive elements is configured to convert the intensity or luminance level of the received light component into an analog pixel value or an analog pixel signal, that is proportional to the luminance level of the received light component.

The amplifier unit 44 is configured to obtain, from the image sensor 42, the pixel signals, i.e., the pixel values, each of which represents the luminance level of the corresponding pixel as an image, i.e., a frame image. The amplifier unit 44 is configured to amplify the pixel values of the frame image by a predetermined gain.

The A/D converter 45 is configured to convert the analog pixel signals, i.e., the analog pixel values, of the frame image into digital pixel signals, i.e., digital pixel values, of the frame image amplified by the amplifier unit 44 based on a predetermined bit width, i.e., the number of bits.

The readout unit 46 is configured to read out the digital pixel values of the frame image for example row by row, i.e., horizontal line by horizontal line, in accordance with horizontal synchronization signals and vertical synchronization signals, and output the readout digital pixel values to the image interface 52. The readout unit 46 is additionally configured to output, to the image interface 51, the horizontal and vertical synchronization signals.

The processor 52 is configured to recognize, based on the horizontal and vertical synchronization signals, whether each of the pixel values read out by the readout unit 46 corresponds to any pixel position in the two-dimensional effective pixel region of the image sensor 42.

In the memory 53, a two-dimensional frame-memory region corresponding to the two-dimensional effective pixel region of the image sensor 42 is prepared beforehand. The processor 52 is configured to store each of the pixel values of the frame image read out by the readout unit 46 in a corresponding one of the recognized pixel positions, i.e., pixel addresses, of the two-dimensional frame-memory region in the memory 53.

The processor 52 is configured to perform the sequence of the various operations of image-signal processing on the pixel values of the frame image stored in the memory 53, and output the processing results to the vehicle control apparatus 2.

The processor 52 is additionally configured to perform the exposure/brightness control task based on the pixel values of the frame image stored in the memory 53.

For example, the processor 52 is configured to output, to the exposure control mechanism 43, a shutter-speed adjustment signal and/or a frame-rate adjustment signal that instructs the exposure control mechanism 43 to adjust the exposure time, i.e., the shutter time or the shutter speed, of the image sensor 42 to accordingly adjust the frame rate of the camera 4.

Specifically, an increase in the exposure time of the image sensor 42, i.e., a decrease in the shutter speed of the image sensor 42, enables (i) the brightness of a frame image to be captured by the camera 4 to be increased and (ii) the frame rate of the camera 4 to be decreased. Otherwise, a decrease in the exposure time of the image sensor 42, i.e., an increase in the shutter speed of the image sensor 42, enables (i) the brightness of a frame image to be captured by the camera 4 to decrease and (ii) the frame rate of the camera 4 to increase.

Moreover, the processor 52 is configured to output, to the amplifier unit 43, a gain adjustment signal that instructs the amplifier unit 44 to increase or decrease the gain of the amplifier unit 44.

Specifically, an increase in the gain of the amplifier unit 44 enables the brightness of the frame image captured by the image sensor 42 to be increased. Otherwise, a decrease in the gain of the amplifier unit 44 enables the brightness of the frame image captured by the image sensor 42 to be decreased.

FIG. 2 illustrates an example of the exposure/brightness control task carried out by the camera ECU 5, i.e., the processor 52. FIG. 3 illustrates how a brightness measurement task included in the exposure/brightness control task is carried out.

When starting the exposure/brightness control task, the processor 52 captures the frame image, i.e., the pixel values of the frame image, captured by the camera 4, and stores the captured frame image in the two-dimensional frame-memory region of the memory 53 in step S201 of FIG. 2.

FIG. 3 schematically illustrates the two-dimensional effective pixel region of the image sensor 42 of the camera 4 using reference character D1. The two-dimensional effective pixel region D1 of the image sensor 42, which has, for example, a horizontally-long rectangular shape, represents the full pixel area of the two-dimensionally arranged pixels (light-sensitive elements) of the image sensor 42, or a remaining two-dimensional region defined by subtracting, from the full pixel area of the two-dimensionally arranged pixels, optical black pixels located at the edges of the full pixel area; the two-dimensional effective pixel region D1 has a sufficient area onto which an image of incoming light can be focused by the wide-angle lens 41.

Because the two-dimensional frame-memory region prepared in the memory 53 corresponds to the two-dimensional effective pixel region D1 of the image sensor 42, the two-dimensional frame-memory region prepared in the memory 53 can also be referred to as a two-dimensional frame-memory region D1 hereinafter.

FIG. 3 also illustrates an imaging region D2 defined in the two-dimensional effective pixel region D1. The imaging region D2, which has a substantially point-symmetric shape with respect to a center thereof, is a remaining two-dimensional region defined by subtracting, from the two-dimensional effective pixel region D1, vignetted pixels by the unillustrated lens barrel of the camera 4. For example, if the camera 4 is mounted to the front of the vehicle V for capturing a forward view from the vehicle V, a forward view from the vehicle V can be clearly imaged on the imaging region D2. Specifically, an imaging region corresponding to the imaging region D2 can also be defined in the two-dimensional frame-memory region D1 of the memory 53.

Following the operation in step S201, the processor 52 sets, on the imaging region D2 of the image sensor 42 and/or the imaging region D2 of the memory 53, a brightness measurement region D3 in step S202a1.

FIG. 3 schematically illustrates an example of the configuration of the brightness measurement region D3 according to the first embodiment.

Specifically, the brightness measurement region D3 is comprised of a pair of top and bottom boundary lines D31 extending linearly in the horizontal direction, and a pair of left and right boundary lines D32 extending linearly in the vertical direction. That is, the brightness measurement region D3 has a substantially rectangular shape surrounded by the pair of top and bottom boundary lines D31 and the pair of left and right boundary lines D32. In particular, the processor 52 sets, on the imaging region D2, the brightness measurement region D3 whose center is substantially aligned with the center of the imaging region D2.

The brightness measurement region D3 includes a plurality of horizontal partition lines D33 arranged between the paired top and bottom boundary lines D31; each horizontal partition line D33 extends in the horizontal direction. The brightness measurement region D3 also includes a plurality of vertical partition lines D34 arranged between the paired left and right boundary lines D32; each vertical partition line D34 extends in the vertical direction.

That is, the horizontal partition lines D33 and the vertical partition lines D34 cross each other to constitute a grid pattern that is comprised of a plurality of subregions F sectioned by the horizontal partition lines D33 and the vertical partition lines D34, resulting in the subregions F having respective rectangular shapes. The number of subregions F in the brightness measurement region D3 can be determined by the specifications of the processor, i.e., image signal processor, 52.

The brightness measurement region D3 is comprised of a center part and peripheral parts surrounding the center part, so that the subregions F are divided into at least central subregions included in the center part and peripheral subregions included in the peripheral parts. The size of the center part and the size of each peripheral part can be freely determined.

In particular, the central subregions have respective shapes and the peripheral subregions have respective shapes; the shapes of the respective central subregions are different from those of the peripheral subregions.

Specifically, the size and shape of each central subregion and the size and shape of each peripheral subregion included in the brightness measurement region D3 are determined in conformity with a barrel aberration of the wide-angle lens 41.

For example, the shapes of the subregions F of the first embodiment are determined such that the sizes of the subregions F substantially decrease from the center of the imaging region D2 to the outer periphery.

Specifically, as illustrated in FIG. 3, intervals between the horizontal partition lines D33 substantially decrease from the center of the imaging region D2 to the top and bottom boundary lines D31, and intervals between the vertical partition lines D34 substantially decrease from the center of the imaging region D2 to the left and right boundary lines D32. This results in a center of the brightness measurement region D3, which will be referred to as at least one center subregion F1, having the largest size in all the subregions F, each corner of the brightness measurement region D3, which will be referred to as a corner subregion F2, having the smallest size in all the subregions F. The remaining subregions, which will be referred to as middle regions F3, respectively have sizes larger than the size of any corner subregion F2 and smaller than the size of the at least one center subregion F1. The sizes of the middle subregions F3 substantially decrease toward the outer periphery of the imaging region D2.

Following the operation in step S202a1, the processor 52 measures, for each of the subregions F of the brightness measurement region D3, a brightness, i.e., a brightness level, of the corresponding one of the subregions F in accordance with the digital pixel value of at least one pixel of the captured frame image included in the corresponding one of the subregions F of the brightness measurement region D3, thus performing brightness measurement of the brightness measurement region D3 in step S202a2.

Because, as brightness measurement of the brightness measurement region D3, one of publicly well-known brightness measurement measures can be used, more detailed descriptions of brightness measurement of each subregion F are omitted.

Following the operation in step S202a2, the processor 52 calculates, based on the measured brightness of each of the subregions F, an exposure control command for the camera 4, and a brightness control command for the amplifier unit 44 in step S203.

In step S203, the processor 52 for example can calculate, as the exposure control command, a controlled value of the exposure time, i.e., the shutter time, of the exposure control mechanism 43 as a function of the measured brightness of each of the subregions F. Similarly, the processor 52 for example can calculate, as the brightness control command, a controlled value of the gain of the amplifying unit 44 as a function of the measured brightness of each of the subregions F.

Because, as calculation of the exposure control command, one of publicly well-known measures can be used, more detailed descriptions of calculation of the exposure control command are omitted. Similarly, as calculation of the brightness control command, one of publicly well-known measures can be used, more detailed descriptions of calculation of the brightness control command are omitted.

Following the operation in step S203, the processor 52 performs exposure control and brightness control through the exposure control mechanism 43 and the amplifier unit 44 in step S204.

Specifically, the processor 52 outputs the exposure control command to the exposure control mechanism 43 to accordingly instruct the exposure control mechanism 43 to determine the exposure time, i.e., the shutter time, of the exposure control mechanism 43 for a next captured frame image in accordance with the exposure control command in step S204. Additionally, the processor 52 outputs the brightness control command to the amplifier unit 44 to accordingly instruct the amplifier unit 44 to determine a level of the gain for each pixel of the next captured frame image in accordance with the brightness control command in step S204. After completion of the operation in step S204, the processor 52 terminates the exposure/brightness control task.

As described above, the camera ECU 5 of the first embodiment is configured to partition the brightness measurement region D3 of the imaging region D2 to create the subregions F whose sizes become smaller toward the outer periphery of the imaging region D2.

As described above, the camera 4 is configured as a wide-area camera so that there is a barrel distortion in a captured image. This therefore results in the center of the captured image being larger than the peripheries of the captured image. The larger center of the captured image may result in real dimensions, such as real length and/or real size, in any subregion included in the center of the captured image being relatively smaller. Similarly, the smaller peripheries of the captured image may result in real dimensions in any subregion included in the peripheries of the captured image being relatively larger.

From this viewpoint, the above configuration of the camera ECU 5 according to the first embodiment, which makes larger the center part of the brightness measurement region D3 than the peripheral parts thereof, enables a brightness distribution measured in the brightness measurement region D3 to match a brightness distribution in a corresponding region in a real space. This therefore makes it possible to control the brightness of the captured image and the exposure time, i.e., the shutter time, of the camera 4 in accordance with the measured brightness distribution that matches the brightness distribution in the real space.

Additionally, let us consider a comparative example where the camera ECU 5 finely partitions the entire brightness measurement region D3. In the comparative example, the number of partitions of the brightness measurement region D3 increases simply, resulting in the processing load of the camera ECU 5 required for each partitioned subregion F increasing.

In contrast, the camera ECU 5 of the first embodiment is configured to partition the peripheral parts of the brightness measurement region D3 to be smaller than the center part thereof to accordingly prevent smaller partitions of the center part of the brightness measurement region D3. This therefore prevents, as small as possible, the processing load of the camera ECU 5 from increasing.

Second Embodiment

The following describes the second embodiment of the present disclosure.

The configuration of the camera ECU 5 of the second embodiment is substantially identical to that of the camera ECU 5 of the first embodiment except for the configuration of the brightness measurement region D3. Accordingly, the following describes mainly the different points of the camera ECU 5 of the second embodiment as compared with the camera ECU 5 of the first embodiment.

Figure 4:
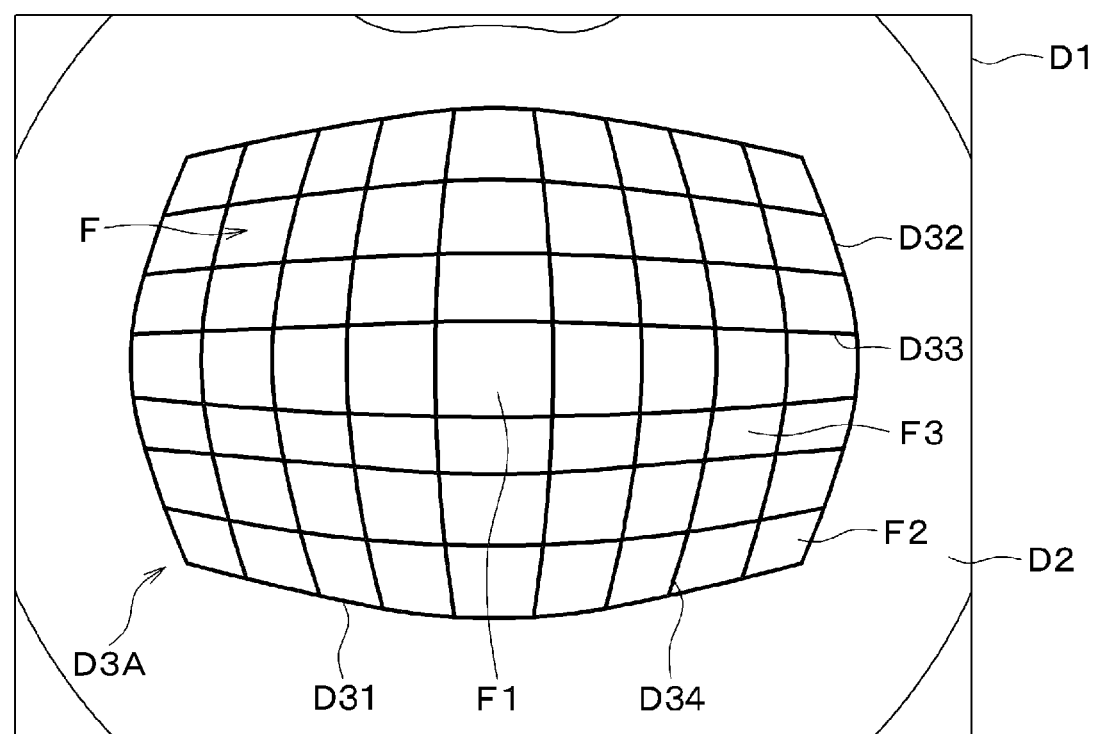
FIG. 4 is a diagram schematically illustrating how a brightness measurement task included in the exposure/brightness control task is carried out according to the first embodiment.

FIG. 4 schematically illustrates the configuration of a brightness measurement region D3A according to the second embodiment.

Specifically, the processor 52 alters the brightness measurement region D3 in conformity with the characteristics of the wide-angle lens 41 to accordingly create the brightness measurement region D3A.

Specifically, the processor 52 alters the rectangular brightness measurement region D3 to accordingly create the brightness measurement region D3A such that the brightness measurement region D3A has a substantially barrel shape that substantially conforms to a barrel aberration of the wide-angle lens 41. This therefore results in (I) Each of the top and bottom boundary lines D31 being curved with its middle convexly projecting outwardly (II) Each of the left and right boundary lines D32 being curved with its middle convexly projecting outwardly (III) The horizontal partition lines D33 being convexly curved outwardly while their curvatures become substantially greater toward the top and bottom boundary lines D31

(IV) The vertical partition lines D34 being convexly curved outwardly while their curvatures become substantially greater toward the left and right boundary lines D32

The curvature of the topmost horizontal partition line D33, which is adjacent to the top boundary line D31 is smaller than that of the top boundary line D31, and the curvature of the bottommost horizontal partition line D33, which is adjacent to the bottom boundary line D31 is smaller than that of the bottom boundary line D31. Similarly, the curvature of the leftmost vertical partition line D34, which is adjacent to the left boundary line D32 is smaller than that of the left boundary line D32, and the curvature of the rightmost horizontal partition line D34, which is adjacent to the right boundary line D32 is smaller than that of the right boundary line D32.

As described above, the brightness measurement region D3A of the second embodiment is configured to be altered in conformity with the characteristics of the wide-angle lens 41. This configuration therefore makes it possible to improve the accuracy of measuring the brightness of the brightness measurement region D3A in addition to the above advantageous benefits achieved by the camera ECU 5 of the first embodiment.

Figure 5:
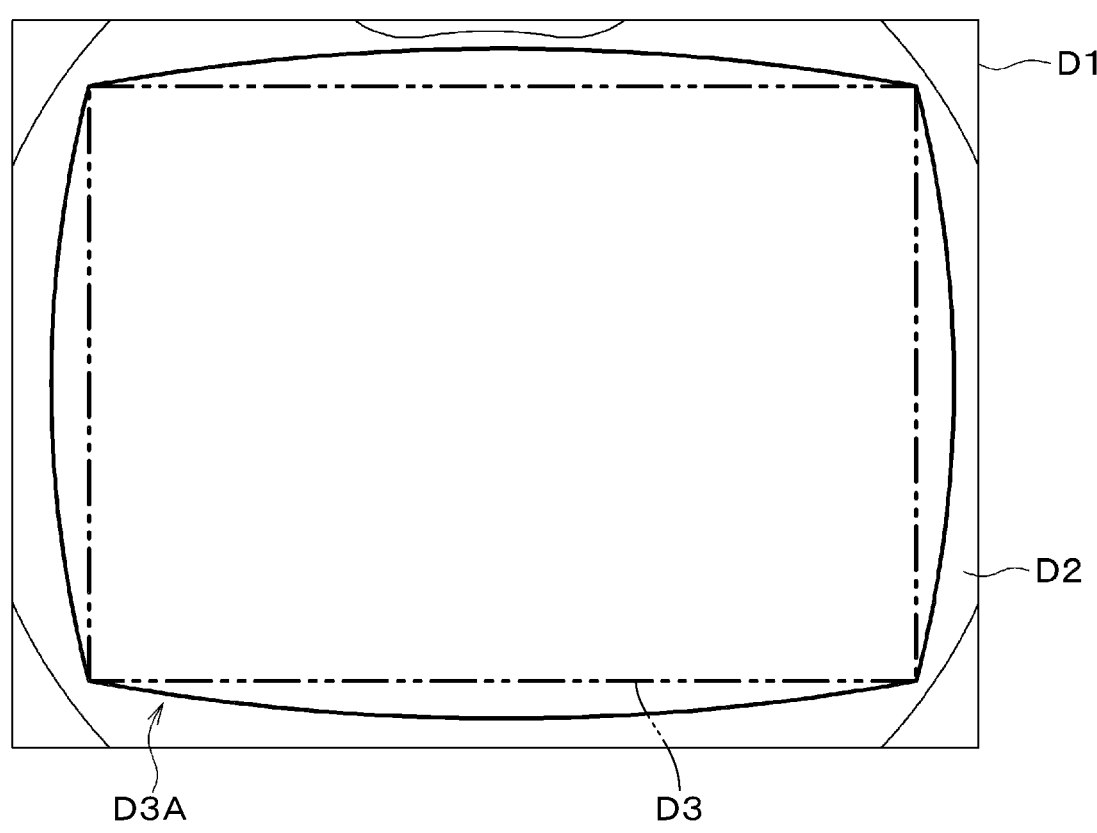
FIG. 5 is a diagram schematically illustrating a modification of a brightness measurement region according to the second embodiment.

Additionally, as illustrated in FIG. 5, the second embodiment enables the size of the brightness measurement region D3A of the second embodiment to be larger than that of the brightness measurement region D3 (see two-dot chain line in FIG. 5) of the first embodiment.

Modifications

While the illustrative exemplary embodiments, i.e., the first and second embodiments, of the present disclosure have been described above, the present disclosure is not limited to the exemplary embodiments. Specifically, the present disclosure includes various modifications and/or alternatives of each of the first and second embodiments within the scope of the present disclosure.

The following describes typical modifications of at least one of the first and second exemplary embodiments. In the typical modifications, to the same parts or equivalent parts of at least one of the first and second embodiments, like reference characters are assigned, so that, as the descriptions of each of the same or equivalent parts of the typical modifications, the descriptions of the corresponding one of the same or equivalent parts of the first embodiment can be employed unless technical contradiction or otherwise specified.

As described above, the descriptions of each of the first and second embodiments are simplified in order to simply describe the contents of the corresponding one of the first and second embodiments. For this reason, the present disclosure is not limited to specific applications or specific structures described in the first and second embodiments.

Specifically, the camera 4 can be mounted to any portion of the vehicle V, and the camera 4 can have any capturable region. For example, the camera 4 can be arranged as a surrounding monitor camera, a forward-view camera, or a rear-view camera.

The camera ECU 5 can be installed in the housing of the camera 4 so as to be integrated with the camera 4. The camera ECU 5 can be alternatively installed in the vehicle control apparatus 2.

Images captured by the camera 4 can be used to be displayed in the compartment of the vehicle V, such as side-view images of side-view mirrors, and can be used to recognize lane markers and/or to assist driver's parking of the vehicle V and/or to autonomously drive the vehicle V.

A Central Processing Unit (CPU) or a Micro Processing Unit (MPU) can be used as the processor 52. The memory 53 can be configured as a single device or an assembly of a plurality of separate storage devices. For example, the memory 53 can be comprised of (i) a ROM and/or a flash memory, which store the instructions of the computer programs and the various parameters, and (ii) a RAM, which hold processing results of the processor 52.

Additionally, the memory 53 can include an image memory in which the captured images can be stored.

The camera ECU 5 can be at least partly comprised of one or more digital circuits configured to perform the above operations of the camera ECU 5, such as one or more Application Specific Integrated Circuits (ASICs) or Field Programmable Gate Arrays (FPGAs). That is, the camera ECU 5 can be comprised of the hybrid of one or more vehicular processor-based units and one or more digital circuits.

The computer-program instructions according to each of the first and second embodiments, which enable the processor 52 to perform various operations set forth above, can be downloaded and/or upgraded through Vehicle-to-X (V2X)

communications. The computer-program instructions can be downloaded and/or upgraded through terminals and public communications networks; the terminals are provided in, for example, a manufacturing factor of the vehicle V, a garage, or an authorized distributor. The computer programs can be stored in a memory card, an optical disk, or a magnetic disk, accessible to the processor 52 which can read out.

The various configurations and operations described in the present disclosure can be implemented by a dedicated computer including a memory and a processor programmed to perform one or more functions embodied by one or more computer programs.

The various configurations and operations described in the present disclosure can also be implemented by a dedicated computer including a processor comprised of one or more dedicated hardware logic circuits.

The various configurations and operations described in the present disclosure can further be implemented by a processor system comprised of a memory, a processor programmed to perform one or more functions embodied by one or more computer programs, and one or more hardware logic circuits.

The one or more computer programs can be stored in a non-transitory storage medium as instructions to be carried out by a computer or a processor. One or more functions and operations described in the present disclosure can be implemented by one or more programmed logic circuits, one or more hardwired logic circuits, and/or one or more hardwired-logic and programmable-logic hybrid circuits.

The present disclosure is not limited to the above specific embodiments.

For example, although the two-dimensional effective pixel region D1 and the imaging region D2 are distinguished from each other, the two-dimensional effective pixel region D1 and the imaging region D2 can be identified to each other. That is, the imaging region D2 can be the two-dimensional effective pixel region D1 itself.

The horizontal partition lines D33 in the brightness measurement region D3A, which has been altered to have a substantially barrel shape, can have regular intervals therebetween like meridians of a globe. The intervals between the horizontal partition lines D33 in the brightness measurement region D3A, which has been altered to have a substantially barrel shape, can substantially decrease from the center of the imaging region D2 to the top and bottom boundary lines D31 as illustrated in FIG. 3.

Similarly, the vertical partition lines D34 in the brightness measurement region D3A, which has been altered to have a substantially barrel shape, can have regular intervals therebetween like meridians of a globe. The intervals between the vertical partition lines D34 in the brightness measurement region D3A, which has been altered to have a substantially barrel shape, can substantially decrease from the center of the imaging region D2 to the left and right boundary lines D32 as illustrated in FIG. 3.

If the camera 4 is configured as a telephoto camera equipped with a telephoto lens 41*a* that has a pincushion aberration, the size and shape of each central subregion and the size and shape of each peripheral subregion included in the brightness measurement region D3 can be determined in conformity with a pincushion aberration of the telephoto lens 41*a*.

Figure 6:
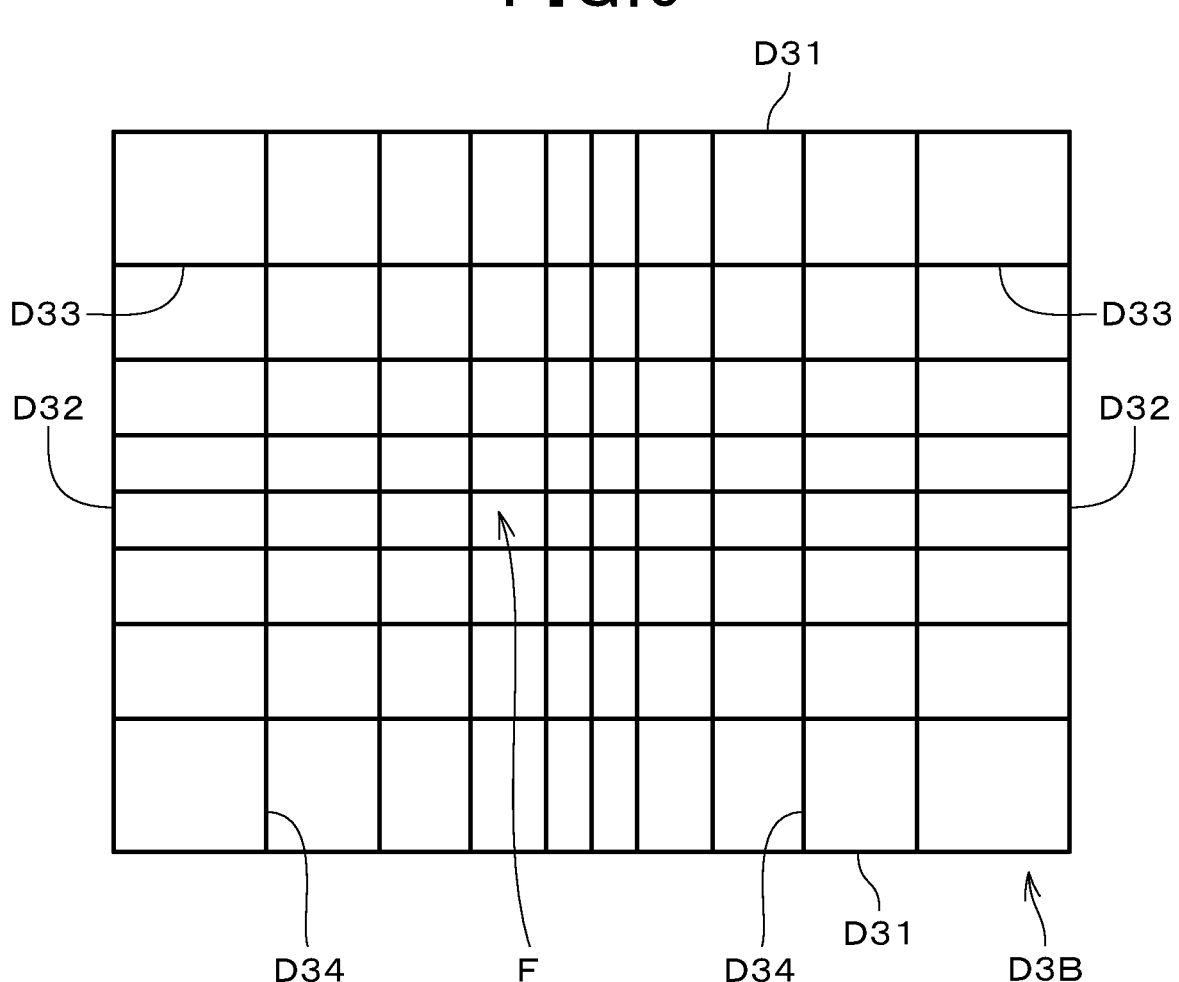
FIG. 6 is a diagram schematically illustrating a configuration of a brightness measurement region that is shaped to conform to a pincushion aberration of a telephoto lens according to a modification of each of the first and second embodiments.

FIG. 6 schematically illustrates the configuration of a brightness measurement region D3B that is shaped to conform to a pincushion aberration of the telephoto lens 41*a*.

The brightness measurement region D3B is comprised of a center part and peripheral parts surrounding the center part, so that the subregions F of the brightness measurement region D3B are divided into at least central subregions included in the center part and peripheral subregions included in the peripheral parts. The size of the center part and the size of each peripheral part can be freely determined.

Specifically, the size and shape of each central subregion and the size and shape of each peripheral subregion included in the brightness measurement region D3B are determined in conformity with a pincushion aberration of the telephoto lens 41*a*.

For example, the shapes of the subregions F are determined such that the sizes of the subregions F substantially increase from the center of the imaging region D2 to the outer periphery.

Specifically, as illustrated in FIG. 6, intervals between the horizontal partition lines D33 substantially increase from the center of the imaging region D2 to the top and bottom boundary lines D31, and intervals between the vertical partition lines D34 substantially increase from the center of the imaging region D2 to the left and right boundary lines D32.

Figure 7:
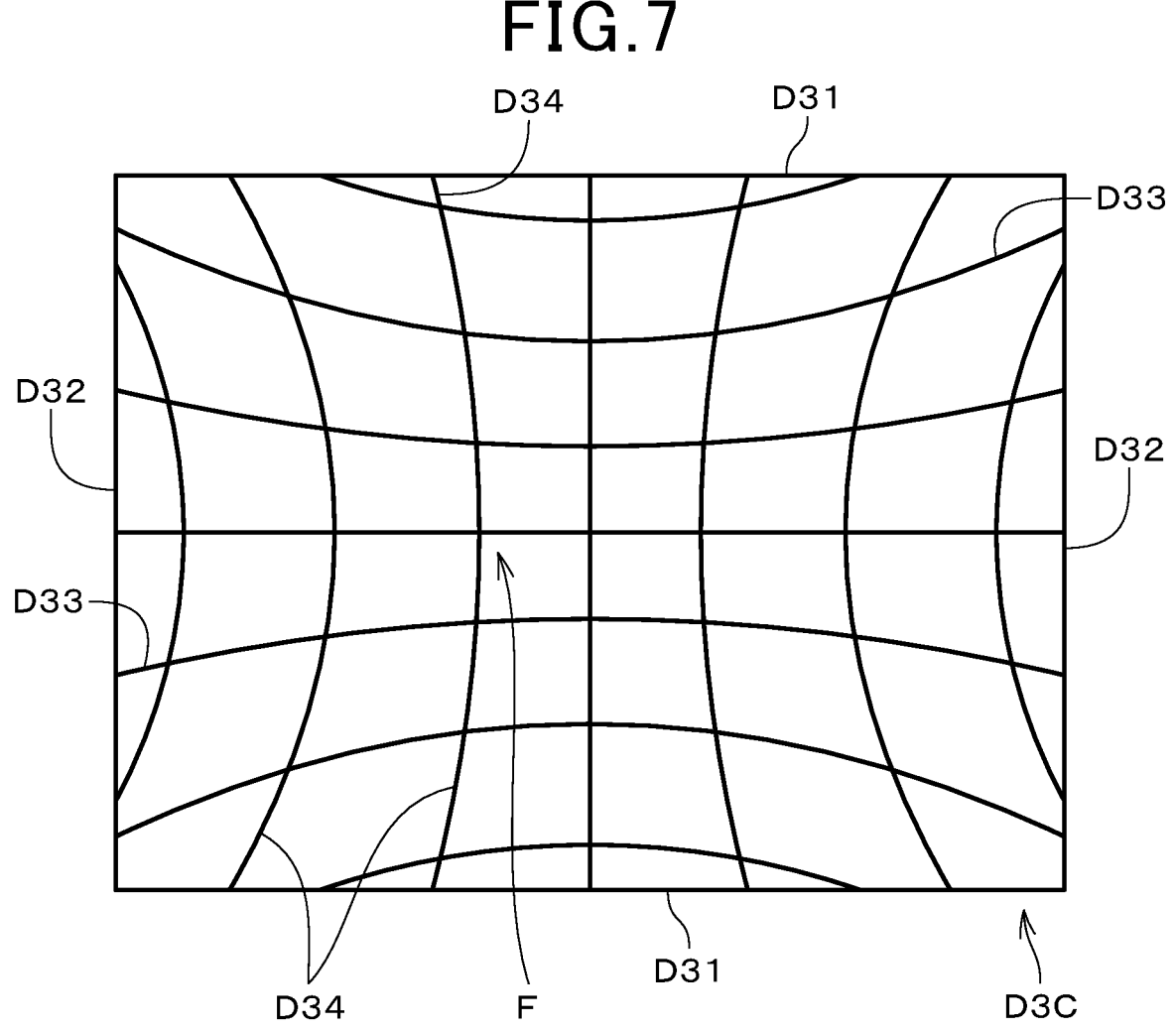
FIG. 7 is a diagram schematically illustrating a configuration of a brightness measurement region according to a modification of the brightness measurement region illustrated in FIG. 6.

FIG. 7 schematically illustrates the configuration of a brightness measurement region D3C according to a modification of the brightness measurement region D3B.

Specifically, the brightness measurement region D3B can be modified in conformity with the characteristics of the telephoto lens 41*a* as the brightness measurement region D3C.

Specifically, the brightness measurement region D3C has a substantially pincushion shape that substantially conforms to a pincushion aberration of the telephoto lens 41*a*. This therefore results in (I) Each of the top and bottom boundary lines D31 being curved with its middle convexly projecting inwardly (II) Each of the left and right boundary lines D32 being curved with its middle convexly projecting inwardly (III) The horizontal partition lines D33 being convexly curved inwardly while their curvatures become substantially greater toward the top and bottom boundary lines D31

(IV) The vertical partition lines D34 being convexly curved inwardly while their curvatures become substantially greater toward the left and right boundary lines D32

The curvature of the topmost horizontal partition line D33, which is adjacent to the top boundary line D31 is smaller than that of the top boundary line D31, and the curvature of the bottommost horizontal partition line D33, which is adjacent to the bottom boundary line D31 is smaller than that of the bottom boundary line D31. Similarly, the curvature of the leftmost vertical partition line D34, which is adjacent to the left boundary line D32 is smaller than that of the left boundary line D32, and the curvature of the rightmost horizontal partition line D34, which is adjacent to the right boundary line D32 is smaller than that of the right boundary line D32.

After setting the brightness measurement region D3, D3A, D3B, or D3C in step S202*a*1, the processor 52 can thin out, i.e., exclude, one or more subregions F, such as corner subregions F2 and some subregions F located therearound, from the brightness measurement region D3, D3A, D3B, or D3C in step S202*a*. Then, the processor 52 can measure, for each of the remaining subregions F of the brightness measurement region D3, D3A, D3B, or D3C, a brightness, i.e., a brightness level, of the corresponding one of the remaining subregions F in accordance with the digital pixel value of at least one pixel of the captured frame image included in the corresponding one of the remaining subregions F of the brightness measurement region D3 in step S202a2.

Alternatively, the processor 52 can be configured to exclude, from at least one selected subregion in the subregions F of the brightness measurement region D3, D3A, D3B, or D3C, at least one cell in step S202a2. Note that at least one cell can be comprised of one or more pixels.

Then, the processor 52 can measure, at least for the selected subregion, a brightness, i.e., a brightness level, of the selected subregion in accordance with the digital pixel value of at least one pixel of the captured frame image included in the remaining cells of the selected subregion in step S202a2.

Figure 8:
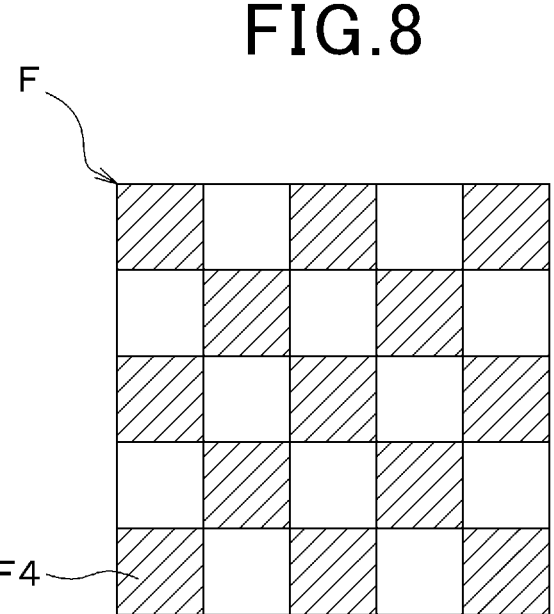
FIG. 8 is a diagram schematically illustrating cells that have been excluded from (3×3) cells of any subregion.

FIG. 8 illustrates any subregion F, which is comprised of, for example, (3×3) cells, from which hatched cells F4 have been excluded as exclusion cells F4.

The processor 52 sets, on the imaging region D2, the brightness measurement region D3, D3A, D3B, or D3C whose center is substantially aligned with the center of the imaging region D2 in step S202a1, but the present disclosure is not limited thereto.

Specifically, if the camera ECU 5 of the present disclosure is employed to mainly recognize lane markers on a road on which the vehicle V is traveling, the processor 52 can be configured to set the brightness measurement region D3 on a lower part of the two-dimensional effective pixel region D1 or the imaging region R2. In this modification, the processor 52 can be configured to delete an upper part of the brightness measurement region D3, which is located above the at least one center subregion F1. This results in the at least one center subregion F1, which has the largest size in all the subregions F, being located at the uppermost edge of the brightness measurement region D3. That is, the at least one center subregion F1 is not limited to be located at the center of the brightness measurement region D3.

The present disclosure is not limited to the above modifications of the first and second exemplary embodiments. Selected ones of the above modifications can be combined with each other. At least part of the above exemplary embodiments and at least part of the above modifications can be combined with each other.

As clearly apparent from the above exemplary embodiments and the modifications, the present disclosure includes at least the following aspects:

The first aspect is a brightness measurement apparatus (5). The brightness measurement apparatus includes a memory (53) storing computer-program instructions, and a processor (52) communicable with the memory and a camera (4). The processor is configured to execute the computer-program instructions to accordingly set, on an imaging region (D2) related to the camera, a brightness measurement region (D3, D3A, D3B, D3C) that has a center part and peripheral parts that surround the center part. The brightness measurement region includes a plurality of subregions (F). The plurality of subregions includes central subregions located in the center part of the brightness measurement region, and peripheral subregions located in the peripheral parts of the brightness measurement region. A size of at least one of the central subregions is different from a size of at least one of the peripheral subregions. The processor is configured to execute the computer-program instructions to accordingly measure, for each of the plurality of subregions of the brightness measurement region, a brightness of the corresponding one of the plurality of subregions of the brightness measurement region in accordance with a pixel value of at least one pixel of a frame image captured by the camera through the imaging region. The pixel value of the at least one pixel of the frame image is included in the corresponding one of the plurality of subregions.

The second aspect is that, in the brightness measurement apparatus according to the first aspect, the processor is configured to set the brightness measurement region such that the sizes of the plurality of subregions substantially decrease toward an outer periphery of the imaging region.

The third aspect is that, in the brightness measurement apparatus according to the first aspect, the camera comprises a lens that has a predetermined aberration, and the processor is configured to alter a shape of the brightness measurement region in conformity with the predetermined aberration of the lens of the camera.

The fourth aspect is that, in the brightness measurement apparatus according to the first aspect, each of the plurality of subregions includes a plurality of cells. The processor is configured to exclude, from the plurality of cells of at least one selected subregion in the plurality of subregions, at least one cell, and measure, for the at least one selected subregion, the brightness of the at least one selected subregion in accordance with the pixel value of the at least one pixel of the frame image. The pixel value of the at least one pixel of the frame image is included in remaining cells of the at least one selected subregion.

The fifth aspect is that, in the brightness measurement apparatus according to the first aspect, the lens of the camera is one of a wide-angle lens and a telephoto lens, the wide-angle lens has a predetermined barrel aberration, and the telephote lens has a predetermined pincushion aberration. The processor is configured to alter a shape of the plurality of subregions in conformity with the predetermined barrel aberration of the wide-angle lens of the camera if the lens of the camera is the wide-angle lens, and alter a shape of the plurality of subregions in conformity with the predetermined pincushion aberration of the telephoto lens of the camera if the lens of the camera is the telephoto lens.

The sixth aspect is a method to be executed by a processor (52) in accordance with computer-program instructions stored in a memory (53). The method includes (i) setting, on an imaging region (D2) of a camera (4), a brightness measurement region (D3, D3A, D3B, D3C) that has a center part and peripheral parts that surround the center part. The brightness measurement region includes a plurality of subregions (F). The plurality of subregions includes central subregions located in the center part of the brightness measurement region, and peripheral subregions located in the peripheral parts of the brightness measurement region. A size of at least one of the central subregions is different from a size of at least one of the peripheral subregions.

The method includes (ii) measuring, for each of the plurality of subregions of the brightness measurement region, a brightness of the corresponding one of the plurality of subregions of the brightness measurement region in accordance with a pixel value of at least one pixel of a frame image captured by the camera through the imaging region. The pixel value of the at least one pixel of the frame image is included in the corresponding one of the plurality of subregions.

The seventh aspect is that, in the method according to the sixth aspect, the setting step sets the brightness measurement region such that the sizes of the plurality of subregions substantially decrease toward an outer periphery of the imaging region.

The eighth aspect is that, in the method according to the sixth aspect, the camera comprises a lens that has a predetermined aberration, and the method further includes altering a shape of the brightness measurement region in conformity with the predetermined aberration of the lens of the camera.

The ninth aspect is that, in the method according to the sixth aspect, each of the plurality of subregions includes a plurality of cells. The method further includes excluding, from the plurality of cells of at least one selected subregion in the plurality of subregions, at least one cell. The measuring step measures, for the at least one selected subregion, the brightness of the at least one selected subregion in accordance with the pixel value of the at least one pixel of the frame image. The pixel value of the at least one pixel of the frame image being included in remaining cells of the at least one selected subregion.

The tenth aspect is that, in the method according to the sixth aspect, the lens of the camera is one of a wide-angle lens and a telephoto lens, the wide-angle lens has a predetermined barrel aberration, and the telephote lens has a predetermined pincushion aberration. The method further includes altering a shape of the plurality of subregions in conformity with the predetermined barrel aberration of the wide-angle lens of the camera if the lens of the camera is the wide-angle lens. The method further includes altering a shape of the plurality of subregions in conformity with the predetermined pincushion aberration of the telephoto lens of the camera if the lens of the camera is the telephoto lens.

The eleventh aspect is a processor-readable program product. The processor-readable program product includes a storage media (53), and a set of computer-program instructions stored in the storage media. The computer-program instructions cause a processor (52) to set, on an imaging region (D2) of a camera (4), a brightness measurement region (D3, D3A, D3B, D3C) that has a center part and peripheral parts that surround the center part. The brightness measurement region includes a plurality of subregions (F). The plurality of subregions includes central subregions located in the center part of the brightness measurement region, and peripheral subregions located in the peripheral parts of the brightness measurement region. A size of at least one of the central subregions is different from a size of at least one of the peripheral subregions. The computer-program instructions cause the processor to measure, for each of the plurality of subregions of the brightness measurement region, a brightness of the corresponding one of the plurality of subregions of the brightness measurement region in accordance with a pixel value of at least one pixel of a frame image captured by the camera through the imaging region. The pixel value of the at least one pixel of the frame image is included in the corresponding one of the plurality of subregions.

The twelfth aspect is that, in the processor-readable program product according to the eleventh aspect, the computer-program instructions cause the processor to set the brightness measurement region such that the sizes of the plurality of subregions substantially decrease toward an outer periphery of the imaging region.

The thirteenth aspect is that, in the processor-readable program product according to the eleventh aspect, the camera comprises a lens that has a predetermined aberration, and the computer-program instructions cause the processor to alter a shape of the brightness measurement region in conformity with the predetermined aberration of the lens of the camera.

The fourteenth aspect is that, in the processor-readable program product according to the eleventh aspect, each of the plurality of subregions comprises a plurality of cells. The computer-program instructions cause the processor to exclude, from the plurality of cells of at least one selected subregion in the plurality of subregions, at least one cell. The computer-program instructions cause the processor to measure, for the at least one selected subregion, the brightness of the at least one selected subregion in accordance with the pixel value of the at least one pixel of the frame image. The pixel value of the at least one pixel of the frame image is included in remaining cells of the at least one selected subregion.

The fifteenth aspect is that, in the processor-readable program product according to the eleventh aspect, the lens of the camera is one of a wide-angle lens and a telephoto lens, the wide-angle lens has a predetermined barrel aberration, and the telephote lens has a predetermined pincushion aberration. The computer-program instructions cause the processor to alter a shape of the plurality of subregions in conformity with the predetermined barrel aberration of the wide-angle lens of the camera if the lens of the camera is the wide-angle lens. The computer-program instructions cause the processor to alter a shape of the plurality of subregions in conformity with the predetermined pincushion aberration of the telephoto lens of the camera if the lens of the camera is the telephoto lens.

The sixteen aspect is a camera system (3). The camera system includes a camera (4) comprising a lens (41, 41a), and a brightness measurement apparatus (5). The brightness measurement apparatus (5) is configured to set, on an imaging region (D2) of the camera, a brightness measurement region (D3, D3A, D3B, D3C) that has a center part and peripheral parts that surround the center part. The brightness measurement region includes a plurality of subregions (F). The plurality of subregions includes central subregions located in the center part of the brightness measurement region, and peripheral subregions located in the peripheral parts of the brightness measurement region. A size of at least one of the central subregions is different from a size of at least one of the peripheral subregions. The brightness measurement apparatus (5) is configured to measure, for each of the plurality of subregions of the brightness measurement region, a brightness of the corresponding one of the plurality of subregions of the brightness measurement region in accordance with a pixel value of at least one pixel of a frame image captured by the camera through the imaging region. The pixel value of the at least one pixel of the frame image is included in the corresponding one of the plurality of subregions.

The seventeen aspect is that, in the camera system according to the sixteenth aspect, the brightness measurement apparatus is configured to set the brightness measurement region such that the sizes of the plurality of subregions substantially decrease toward an outer periphery of the imaging region.

The eighth aspect is that, in the camera system according to the sixteenth aspect, the lens has a predetermined aberration, and the brightness measurement apparatus is configured to alter a shape of the brightness measurement region in conformity with the predetermined aberration of the lens of the camera.

The ninth aspect is that, in the camera system according to the sixteenth aspect, each of the plurality of subregions comprises a plurality of cells. The brightness measurement apparatus is configured to exclude, from the plurality of cells of at least one selected subregion in the plurality of subregions, at least one cell. The brightness measurement apparatus is configured to measure, for the at least one selected subregion, the brightness of the at least one selected subregion in accordance with the pixel value of the at least one pixel of the frame image. The pixel value of the at least one pixel of the frame image is included in remaining cells of the at least one selected subregion.

The invention claimed is:

1. A brightness measurement apparatus comprising:

a memory storing computer-program instructions; and a processor communicable with the memory and a camera, the processor being configured to execute the computer-program instructions to accordingly:

set, on an imaging region of the camera, a brightness measurement region that has a center part and peripheral parts that surround the center part, the brightness measurement region comprising a plurality of subregions, the plurality of subregions including:

central subregions located in the center part of the brightness measurement region; and peripheral subregions located in the peripheral parts of the brightness measurement region, a size of at least one of the central subregions being different from a size of at least one of the peripheral subregions; and measure, for each of the plurality of subregions of the brightness measurement region, a brightness of a corresponding one of the plurality of subregions of the brightness measurement region in accordance with a pixel value of at least one pixel of a frame image captured by the camera through the imaging region, the pixel value of the at least one pixel of the frame image being included in the corresponding one of the plurality of subregions.

2. The brightness measurement apparatus according to claim 1, wherein:

the processor is configured to set the brightness measurement region such that the sizes of the plurality of subregions substantially decrease toward an outer periphery of the imaging region.

3. The brightness measurement apparatus according to claim 1, wherein:

the camera comprises a lens that has a predetermined aberration; and the processor is configured to alter a shape of the brightness measurement region in conformity with the predetermined aberration of the lens of the camera.

4. The brightness measurement apparatus according to claim 1, wherein:

each of the plurality of subregions comprises a plurality of cells; and the processor is configured to:

exclude, from the plurality of cells of at least one selected subregion in the plurality of subregions, at least one cell; and measure, for the at least one selected subregion, the brightness of the at least one selected subregion in accordance with the pixel value of the at least one pixel of the frame image, the pixel value of the at least one pixel of the frame image being included in remaining cells of the at least one selected subregion.

5. The brightness measurement apparatus according to claim 1, wherein:

the camera comprises a lens and the lens of the camera is one of a wide-angle lens and a telephoto lens;

the wide-angle lens has a predetermined barrel aberration;

the telephote lens has a predetermined pincushion aberration; and the processor is configured to:

alter a shape of the plurality of subregions in conformity with the predetermined barrel aberration of the wide-angle lens of the camera if the lens of the camera is the wide-angle lens; and alter a shape of the plurality of subregions in conformity with the predetermined pincushion aberration of the telephoto lens of the camera if the lens of the camera is the telephoto lens.

6. A method to be executed by a processor in accordance with computer-program instructions stored in a memory, the method comprising:

setting, on an imaging region of a camera, a brightness measurement region that has a center part and peripheral parts that surround the center part, the brightness measurement region comprising a plurality of subregions, the plurality of subregions including:

central subregions located in the center part of the brightness measurement region; and peripheral subregions located in the peripheral parts of the brightness measurement region, a size of at least one of the central subregions being different from a size of at least one of the peripheral subregions; and measuring, for each of the plurality of subregions of the brightness measurement region, a brightness of a corresponding one of the plurality of subregions of the brightness measurement region in accordance with a pixel value of at least one pixel of a frame image captured by the camera through the imaging region, the pixel value of the at least one pixel of the frame image being included in the corresponding one of the plurality of subregions.

7. The method according to claim 6, wherein:

the setting sets the brightness measurement region such that the sizes of the plurality of subregions substantially decrease toward an outer periphery of the imaging region.

8. The method according to claim 6, wherein:

the camera comprises a lens that has a predetermined aberration; and the method further comprises:

altering a shape of the brightness measurement region in conformity with the predetermined aberration of the lens of the camera.

9. The method according to claim 6, wherein:

each of the plurality of subregions comprises a plurality of cells; the method further comprises:

excluding, from the plurality of cells of at least one selected subregion in the plurality of subregions, at least one cell; and the measuring measures, for the at least one selected subregion, the brightness of the at least one selected subregion in accordance with the pixel value of the at least one pixel of the frame image, the pixel value of the at least one pixel of the frame image being included in remaining cells of the at least one selected subregion.

10. The method according to claim 6, wherein:

the camera comprises a lens and the lens of the camera is one of a wide-angle lens and a telephoto lens;

the wide-angle lens has a predetermined barrel aberration;

the telephote lens has a predetermined pincushion aberration; and the method further comprises:

altering a shape of the plurality of subregions in conformity with the predetermined barrel aberration of the wide-angle lens of the camera if the lens of the camera is the wide-angle lens; and altering a shape of the plurality of subregions in conformity with the predetermined pincushion aberration of the telephoto lens of the camera if the lens of the camera is the telephoto lens.

11. A processor-readable program product comprising:

a non-transitory computer-readable storage medium; and a set of computer-program instructions stored in the storage medium, the computer-program instructions causing a processor to:

set, on an imaging region of a camera, a brightness measurement region that has a center part and peripheral parts that surround the center part, the brightness measurement region comprising a plurality of subregions, the plurality of subregions including:

central subregions located in the center part of the brightness measurement region; and peripheral subregions located in the peripheral parts of the brightness measurement region, a size of at least one of the central subregions being different from a size of at least one of the peripheral subregions; and measure, for each of the plurality of subregions of the brightness measurement region, a brightness of a corresponding one of the plurality of subregions of the brightness measurement region in accordance with a pixel value of at least one pixel of a frame image captured by the camera through the imaging region, the pixel value of the at least one pixel of the frame image being included in the corresponding one of the plurality of subregions.

12. The processor-readable program product according to claim 11, wherein:

the computer-program instructions cause the processor to set the brightness measurement region such that the sizes of the plurality of subregions substantially decrease toward an outer periphery of the imaging region.

13. The processor-readable program product according to claim 11, wherein:

the camera comprises a lens that has a predetermined aberration; and the computer-program instructions cause the processor to alter a shape of the brightness measurement region in conformity with the predetermined aberration of the lens of the camera.

14. The processor-readable program product according to claim 11, wherein:

each of the plurality of subregions comprises a plurality of cells; and the computer-program instructions cause the processor to:

exclude, from the plurality of cells of at least one selected subregion in the plurality of subregions, at least one cell; and measure, for the at least one selected subregion, the brightness of the at least one selected subregion in accordance with the pixel value of the at least one pixel of the frame image, the pixel value of the at least one pixel of the frame image being included in remaining cells of the at least one selected subregion.

15. The processor-readable program product according to claim 11, wherein:

the camera comprises a lens and the lens of the camera is one of a wide-angle lens and a telephoto lens;

the wide-angle lens has a predetermined barrel aberration;

the telephote lens has a predetermined pincushion aberration; and the computer-program instructions cause the processor to:

alter a shape of the plurality of subregions in conformity with the predetermined barrel aberration of the wide-angle lens of the camera if the lens of the camera is the wide-angle lens; and alter a shape of the plurality of subregions in conformity with the predetermined pincushion aberration of the telephoto lens of the camera if the lens of the camera is the telephoto lens.

16. A camera system comprising:

a camera comprising a lens; and a brightness measurement apparatus configured to:

set, on an imaging region of the camera, a brightness measurement region that has a center part and peripheral parts that surround the center part, the brightness measurement region comprising a plurality of subregions, the plurality of subregions including:

central subregions located in the center part of the brightness measurement region; and peripheral subregions located in the peripheral parts of the brightness measurement region, a size of at least one of the central subregions being different from a size of at least one of the peripheral subregions; and measure, for each of the plurality of subregions of the brightness measurement region, a brightness of a corresponding one of the plurality of subregions of the brightness measurement region in accordance with a pixel value of at least one pixel of a frame image captured by the camera through the imaging region, the pixel value of the at least one pixel of the frame image being included in the corresponding one of the plurality of subregions.

17. The camera system according to claim 16, wherein:

the brightness measurement apparatus is configured to set the brightness measurement region such that the sizes of the plurality of subregions substantially decrease toward an outer periphery of the imaging region.

18. The camera system according to claim 16, wherein:

the lens has a predetermined aberration; and the brightness measurement apparatus is configured to alter a shape of the brightness measurement region in conformity with the predetermined aberration of the lens of the camera.

19. The camera system according to claim 16, wherein:

each of the plurality of subregions comprises a plurality of cells; and the brightness measurement apparatus is configured to:

exclude, from the plurality of cells of at least one selected subregion in the plurality of subregions, at least one cell; and measure, for the at least one selected subregion, the brightness of the at least one selected subregion in accordance with the pixel value of the at least one pixel of the frame image, the pixel value of the at least one pixel of the frame image being included in remaining cells of the at least one selected subregion.

* * * * *